(12) United States Patent
Kim et al.

(10) Patent No.: US 9,389,683 B2
(45) Date of Patent: *Jul. 12, 2016

(54) WEARABLE DISPLAY AND METHOD OF CONTROLLING THEREFOR

(71) Applicant: LG ELECTRONICS INC., Seoul (KR)

(72) Inventors: Jongho Kim, Seoul (KR); Sinae Chun, Seoul (KR); Eunhyung Cho, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/459,080

(22) Filed: Aug. 13, 2014

(65) Prior Publication Data

US 2015/0061999 A1    Mar. 5, 2015

Related U.S. Application Data

(63) Continuation-in-part of application No. 14/089,116, filed on Nov. 25, 2013, now Pat. No. 8,836,641.

(30) Foreign Application Priority Data

Aug. 28, 2013 (KR) .................. 10-2013-0102326
Nov. 26, 2013 (WO) ................ PCT/KR2013/010779

(51) Int. Cl.
*G06F 3/01* (2006.01)
*G02B 27/01* (2006.01)
*G06F 3/03* (2006.01)
*G02B 27/00* (2006.01)

(52) U.S. Cl.
CPC ............ *G06F 3/013* (2013.01); *G02B 27/0093* (2013.01); *G02B 27/017* (2013.01); *G06F 3/017* (2013.01); *G06F 3/0304* (2013.01); *G02B 2027/0141* (2013.01); *G02B 2027/0178* (2013.01)

(58) Field of Classification Search
CPC ....... G06F 3/013; G06F 3/017; G06F 3/0304; G02B 27/0093; G02B 27/017; G02B 2027/0141; G02B 2027/0178; G02B 2027/0125; G02B 2027/0143; G02B 2027/0185

See application file for complete search history.

(56) References Cited

U.S. PATENT DOCUMENTS

| 6,087,941 A | 7/2000 | Ferraz |
| 6,788,292 B1 | 9/2004 | Nako et al. |
| 2002/0113755 A1 | 8/2002 | Lee |
| 2004/0189474 A1 | 9/2004 | Borovoy et al. |
| 2004/0192260 A1 | 9/2004 | Sugimoto et al. |
| 2010/0007480 A1 | 1/2010 | Uozumi et al. |
| 2010/0107184 A1 | 4/2010 | Shintani |
| 2011/0013034 A1 | 1/2011 | Chiang et al. |
| 2011/0205148 A1 | 8/2011 | Corriveau et al. |

(Continued)

FOREIGN PATENT DOCUMENTS

| EP | 1 736 812 A1 | 12/2006 |
| JP | 2004-185139 A | 7/2004 |

(Continued)

*Primary Examiner* — Premal Patel
(74) *Attorney, Agent, or Firm* — Birch, Stewart, Kolasch & Birch, LLP

(57) ABSTRACT

The present specification relates to a wearable display and a method of controlling therefor, and more particularly, to a method of updating information displayed in the wearable display by recognizing opening and closing of eyes of a user wearing the wearable display.

20 Claims, 14 Drawing Sheets

(56) References Cited

U.S. PATENT DOCUMENTS

| | | |
|---|---|---|
| 2012/0212400 A1 | 8/2012 | Border et al. |
| 2012/0242570 A1 | 9/2012 | Kobayashi |
| 2013/0033524 A1 | 2/2013 | Wang et al. |
| 2013/0042296 A1* | 2/2013 | Hastings ............... G06F 21/10 726/1 |
| 2013/0107371 A1 | 5/2013 | Devaul |
| 2013/0257709 A1 | 10/2013 | Raffle et al. |

FOREIGN PATENT DOCUMENTS

| | | |
|---|---|---|
| JP | 2007-127716 A | 5/2007 |
| JP | 2008-070572 A | 3/2008 |
| JP | 2010-152443 A | 7/2010 |

\* cited by examiner

FIG. 2
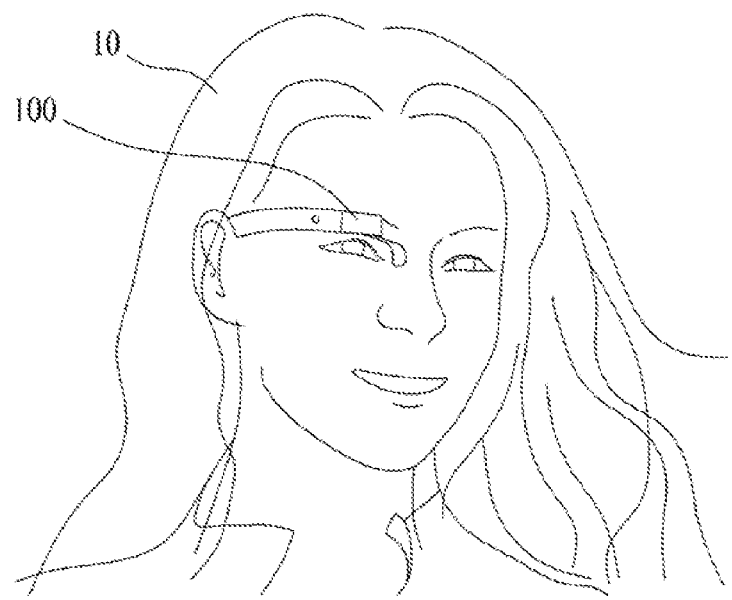
(a)
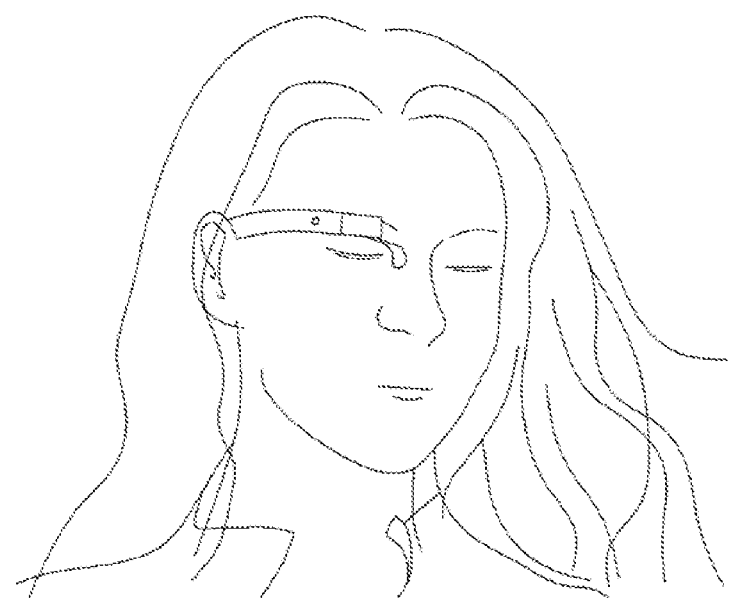
(b)

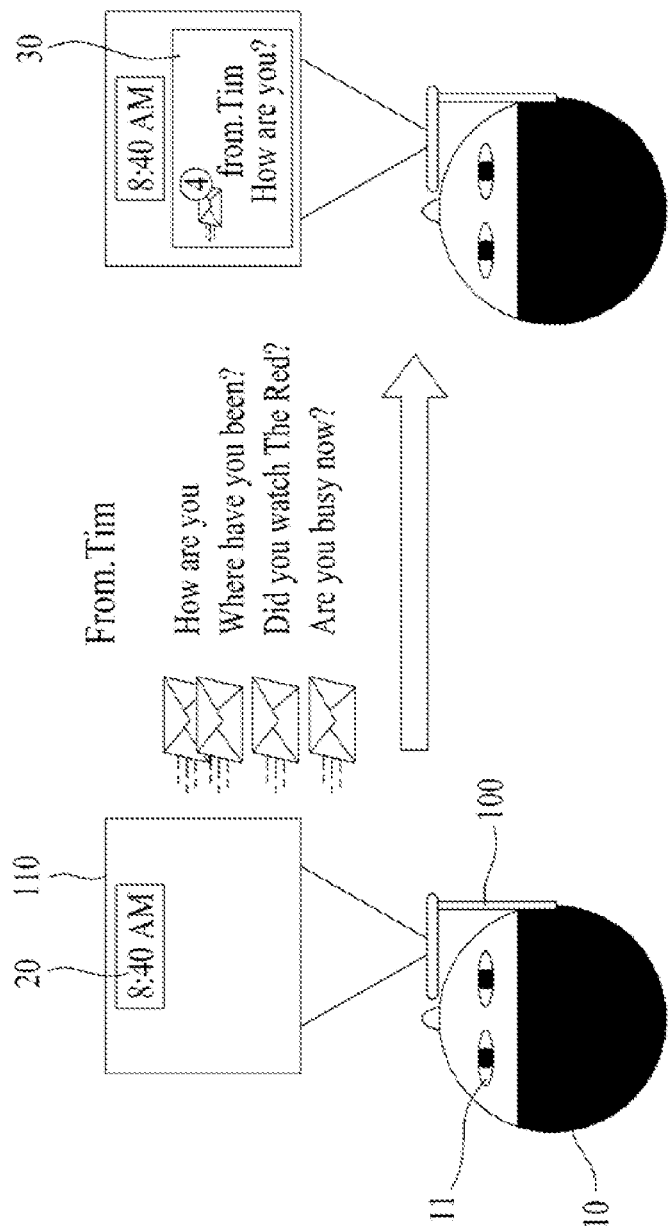

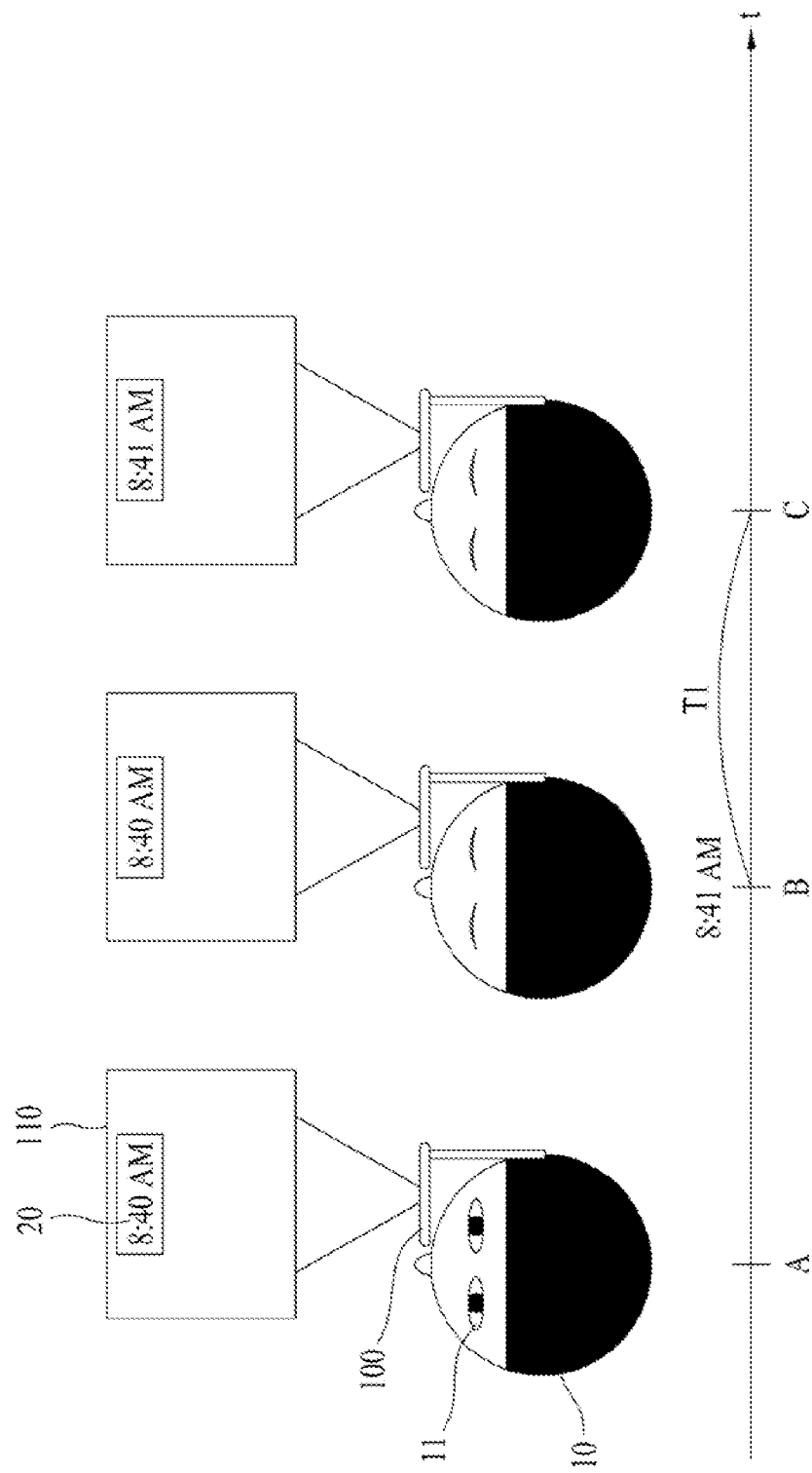

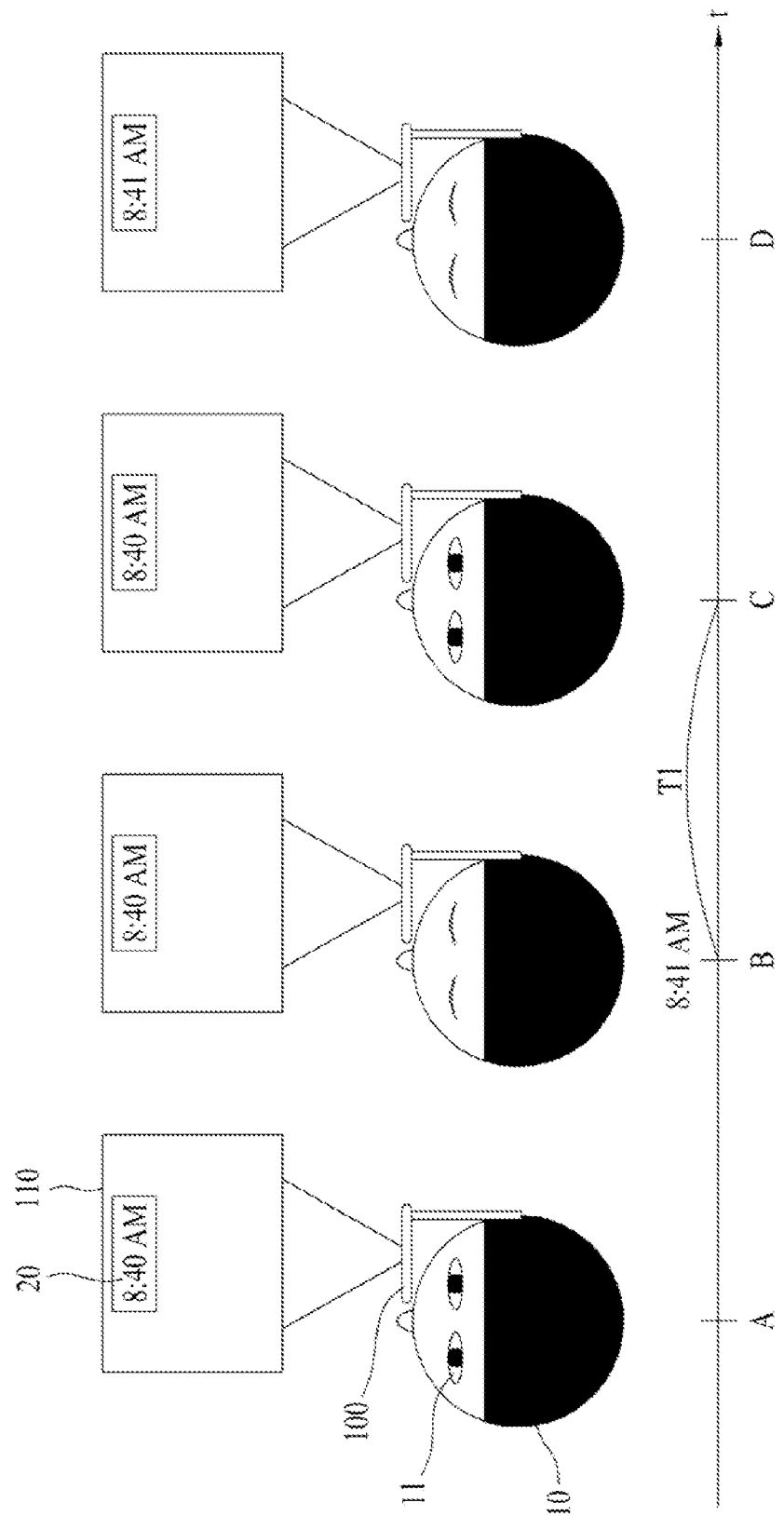

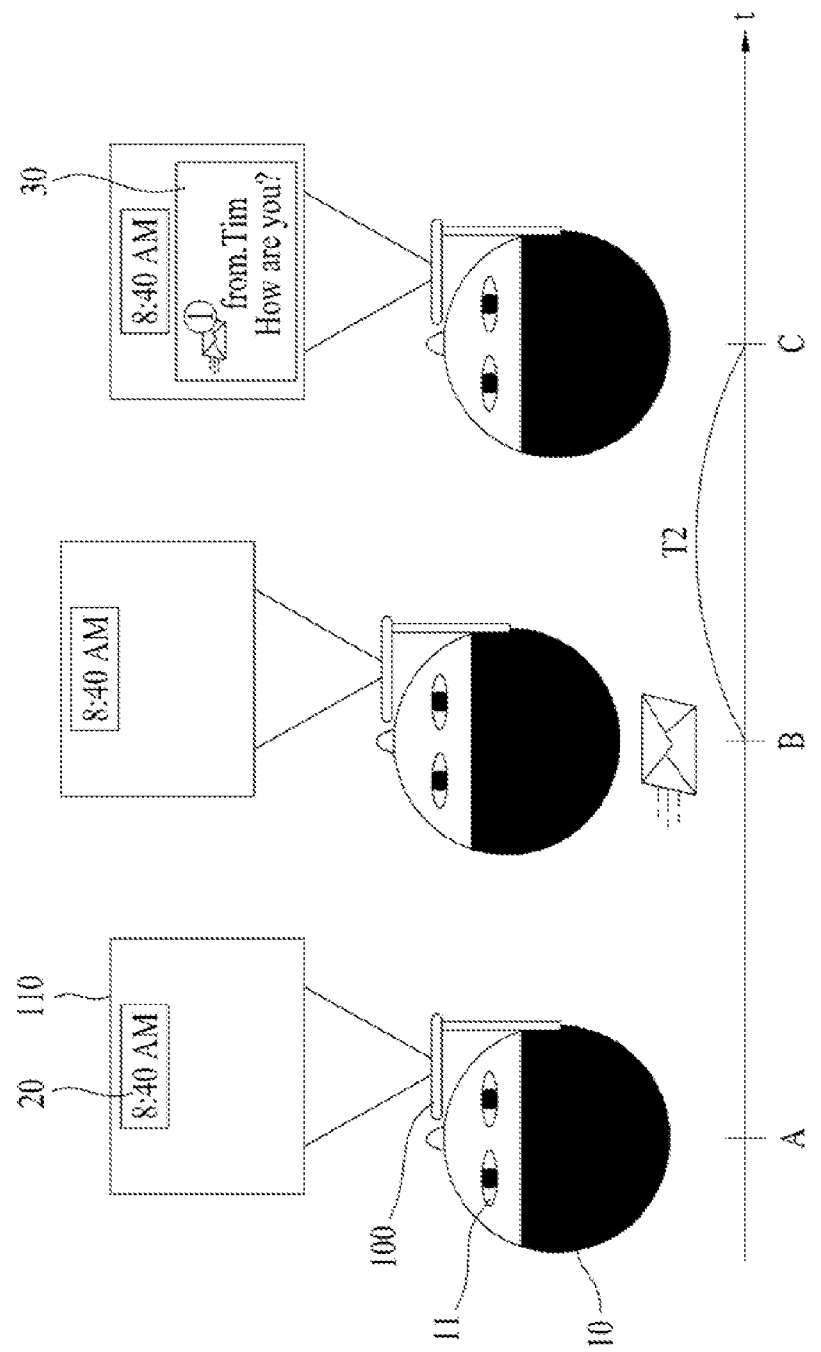

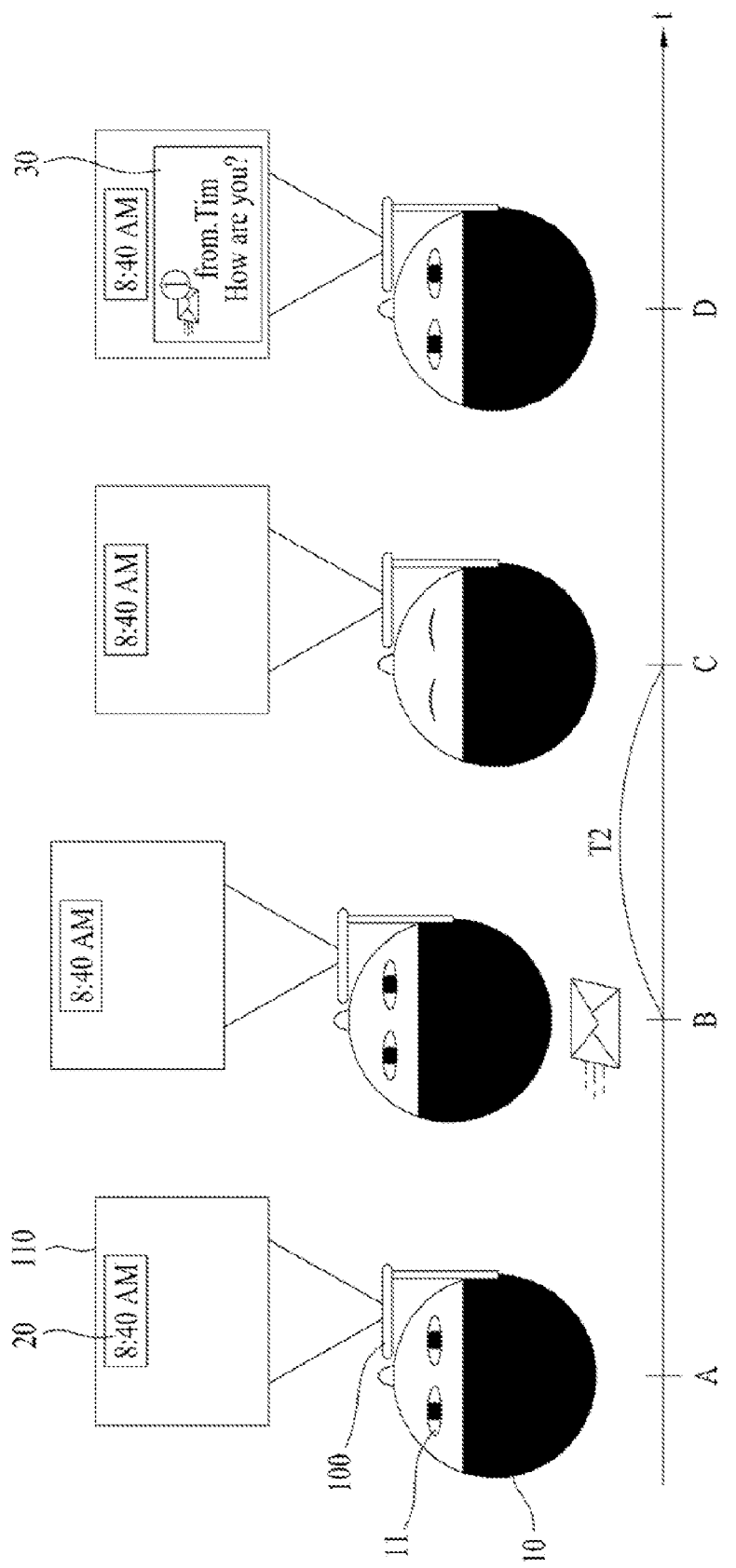

WEARABLE DISPLAY AND METHOD OF CONTROLLING THEREFOR

This application is a Continuation-in-Part of copending U.S. application Ser. No. 14/089,116 filed on Nov. 25, 2013, which claims priority under 35 U.S.C. §119(a) to Patent Application No. 10-2013-0102326 filed in the Republic of Korea on Aug. 28, 2013. The present application also claims priority under 35 U.S.C. §119(a) to PCT/KR2013/010779 filed on Nov. 26, 2013. All of these applications are hereby expressly incorporated by reference into the present application.

BACKGROUND OF THE INVENTION

1. Field of the Invention

The present specification relates to a wearable display and a method of controlling therefor, and more particularly, to a method of updating information displayed in the wearable display by recognizing opening and closing of eyes of a user wearing the wearable display.

2. Discussion of the Related Art

Generally, a head mounted display indicates various digital devices enabling a user to receive a multimedia content in a manner of being mounted on the head of the user like glasses. According to a trend of lightening and miniaturizing of a digital device, various wearable computers have been developed so far and the wearable display is also widely used. The wearable display can provide various conveniences as well as a simple display function to a user in a manner of being combined with an augmented reality technology and an N screen technology.

In case of occurring such update information as a short message service (SMS), a user wearing a wearable display can recognize the update information via the wearable display without checking such a mobile device as a smartphone. For instance, in case of occurring such an event as a time change, a weather change, a date change, a telephone reception, and the like, the wearable display can recognize the occurrence of the event in a state that a user wears the wearable display.

SUMMARY OF THE INVENTION

Accordingly, the present specification is directed to an apparatus and method thereof that substantially obviate one or more problems due to limitations and disadvantages of the related art.

According to one embodiment, a wearable display intends to provide various updates according to a type of object displayed in a display unit.

According to a different embodiment, a wearable display intends to provide an update of an object displayed in a display unit according to a state of eyes-opened/eyes-closed of a user wearing the wearable display.

According to a different embodiment, a wearable display intends to provide each update of objects according to a state of eyes-opened/eyes-closed of a user wearing the wearable display and a type of object displayed in a display unit, respectively.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, according to one embodiment, a wearable display device includes a display unit configured to display visual information, a sensor unit configured to recognize eyes of a user of the wearable display device, and a processor configured to update the displayed visual information when an event is detected, wherein the processor is further configured to detect the event at a first time, postpone updating the displayed visual information when the recognized eyes are in a state of eyes-opened, and update the displayed visual information when the state of eyes-opened is switched to a state of eyes-closed at a second time.

To achieve these objects and other advantages and in accordance with the purpose of the specification, as embodied and broadly described herein, according to a different embodiment, a method of controlling a wearable display device includes displaying visual information in a display unit of the wearable display device, detecting the event for updating the displayed visual information at a first time, recognizing eyes of a user of the wearable display device, postponing updating the displayed visual information when the recognized eyes are in a state of eyes-opened, and updating the displayed visual information when the state of eyes-opened is switched to a state of eyes-closed at a second time.

According to one embodiment, a wearable display can reduce a sense of fatigue of eyes resulted from updating an object in a state of eyes-opened of a user by updating such a frequently updated object as time, weather, and the like in a state of eyes-closed of the user.

According to a different embodiment, a wearable display can easily recognize an event to be recognized by a user in a state of eyes-opened of the user by updating such an object as a message reception, an alarm reception, and the like in the state of eyes-opened of the user.

According to a different embodiment, since an update of an object in a wearable display occurs after a predetermined time elapses after an event occurs in a condition of opening/closing eyes of a user, a wearable display can handle an immediate change of a state of eyes-opened of the user.

More detail advantageous effect of the specification shall be described in detail in the following description.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 2 is a diagram of an eye condition of a user wearing a wearable display according to the present specification;

FIG. 7 is a diagram for a fifth embodiment of a method of controlling a wearable display according to the present specification;

FIG. 8A and FIG. 8B are diagrams for a sixth embodiment of a method of controlling a wearable display according to the present specification;

FIG. 9A and FIG. 9B are diagrams for a seventh embodiment of a method of controlling a wearable display according to the present specification;

DETAILED DESCRIPTION OF THE INVENTION

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Figure 1:
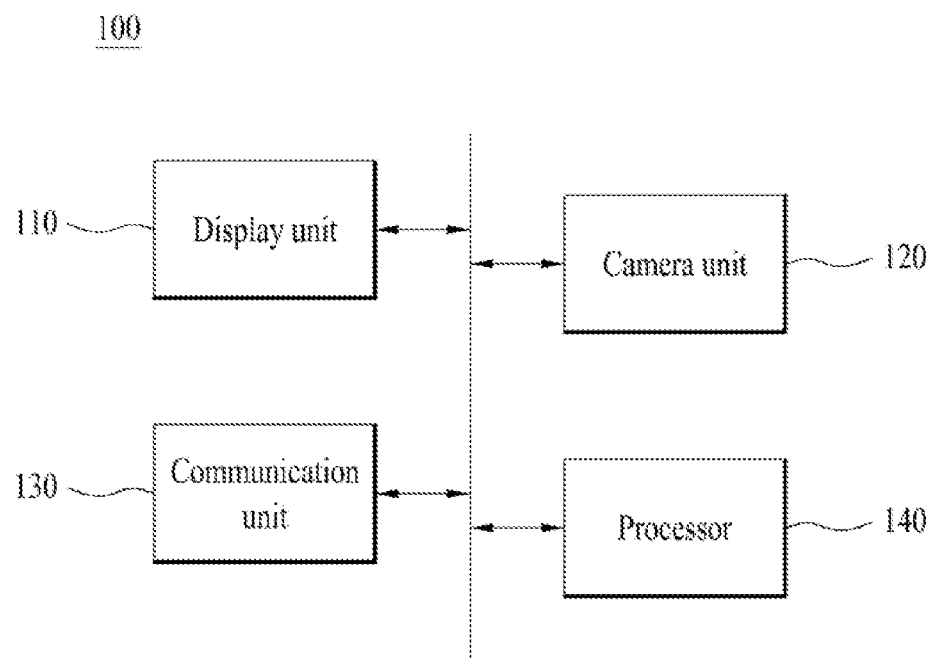
FIG. 1 is a block diagram of a wearable display according to the present specification.

FIG. 1 is a block diagram of a wearable display according to the present specification. The wearable display may include a. Head Mounted Display (HMD), a smart contact lens, or display device mounted on user's body.

Yet, FIG. 1 is just one embodiment and a part of configuring module can be deleted or a new configuring module can be added according to the necessity of those skilled in the art.

As depicted in FIG. 1, a wearable display 100 can include a display unit 110, a camera unit 120, a communication unit 130, and a processor 140.

The display unit 110 can output an image in a display screen. And, the display unit 110 can output an image based on content executed by the processor 140 or a control command of the processor 140.

Meanwhile, in the present specification, the wearable display 100 can output an image in the display screen in various modes. In one embodiment, the wearable display 100 can output an image in a see-through mode. In this case, the see-through mode indicates that the display screen is transparent. The see-through mode indicates a mode capable of using content while a user wearing the wearable display 100 is recognizing the surrounding environment. In another embodiment, the wearable display 100 can output an image in a front-light mode. In this case, the front-light mode indicates a mode capable of displaying an image to which a light is reflected without directly projecting to eyes via such a reflector as a mirror.

And, in another embodiment, the wearable display 100 can output an image in a see-closed mode. In this case, the see-closed mode indicates a mode not capable of seeing an external environment via, the display screen and capable of using contents via the display screen. The present specification is explained under an assumption that the wearable display 100 displays an image in the see-through mode or the front-light mode.

The camera unit 120 can take a picture of an image. More specifically, the camera unit 120 can take a picture of an image of a front direction. In this case, the front direction may indicate a direction at which the camera unit 120 faces. And, the camera unit 120 senses an image within an angle of view area and can provide the image to the processor 140. In this case, the angle of view area indicates a range of a horizontal and vertical viewing angle capable of being included in a prescribed screen in case of sensing an image.

In the present specification, the camera unit 12 can be positioned at an outside or an inside of the wearable display 100. In case that the camera unit 120 is positioned at the outside of the wearable display 100, the camera unit 120 can sense an image of a front direction of the wearable display 100. And, in case that the camera unit 120 is positioned at the inside of the wearable display 100, the camera unit 120 can sense opening and closing of eyes of a user.

The communication unit 130 performs a communication with an external device using various protocols and can transceive a data with the external device using the various protocols. And, the communication unit 130 can transceive such a digital data as content and the like by accessing a network in wired or wireless. For instance, the communication unit 130 can use such a communication standard as WLAN (Wireless LAN) (Wi-Fi), Wibro (Wireless broadband), Wimax (World Interoperability for Microwave Access), HSDPA (High Speed Downlink Packet Access), and the like to access a wireless network.

In the present specification, the communication unit 130 can transmit/receive a data. More specifically, the communication unit 130 can receive an event occurrence for the wearable display 100. For instance, an occurred event may include a time change, a date change, a weather change, e-mail reception, an SNS (social network service) update, SMS reception, and the like.

The processor 140 processes a data, controls each of the units of the aforementioned mobile device 100, and can control data transmission/reception between units.

In the present specification, the processor 140 can detect an event generation. And, the processor 140 can determine whether an event corresponds to first update information. If the event corresponds to the first update information, the processor 140 can recognize a condition to update a first object corresponding to the first update information. And, if a recognized condition corresponds to a first condition, the processor 140 can update the first object corresponding to the first update information. Regarding this, it shall be described in detail in FIG. 3 to FIG. 9B.

As an embodiment of the present specification, operations performed by the wearable display 100 can be controlled by the processor 140. For clarity, in the following description and diagrams, these operations are commonly depicted and explained in a manner that the wearable display 100 performs/controls the operations.

Meanwhile, although it is not depicted in FIG. 1, the wearable display 100 can include a sensor unit, a power unit, a storage unit, and the like. The sensor unit senses a surrounding environment of the device using at least one sensor installed in the wearable display 100 and can deliver a sensed result to the processor 140 in a signal form.

The power unit is a power source connected to an internal battery or an external power supply of the wearable display 100. The power unit can supply power to the wearable display 100. And, the storage unit can e such various digital data as an audio, a picture, a video, an application, and the like. The storage unit may indicate such various digital data storage spaces as a flash memory, RAM (random access memory), SSD (solid state drive), and the like.

The wearable display 100 depicted in FIG. 1 is a block diagram according to one embodiment. Blocks represented in a manner of being separated indicate the logically distinguished elements of the wearable display 100. Hence, the elements of the aforementioned wearable display 100 can be equipped with a single chip or a plurality of chips according to the design of the device.

FIG. 2 is a diagram of an eye condition of a user wearing a wearable display according to the present specification. More specifically, FIG. 2(a) indicates a case that a user wearing the wearable display 100 is in a state of eyes-opened and FIG. 2(b) indicates a case that the user wearing the wearable display 100 is in a state of eyes-closed.

The wearable display 100 can perform a related function in a manner of recognizing eyes-opened/eyes-closed state of a user via the camera unit installed in the wearable display 100. For instance, the wearable display 100 can activate/deactivate the display unit by recognizing the eyes-opened/eyes-closed state of the user and can execute/does not execute a specific application of the wearable display 100. The present specification explains that the wearable display 100 updates various objects according to the state of eyes-opened/eyes-closed of the user.

In one embodiment, as depicted in FIG. 2(a), the wearable display 100 can update second update information for a second object in a state of eyes-opened of the user. In this case, the state of eyes-opened may include a case that the wearable display 100 can recognize a gaze of the user 10 for the display unit as well as a case that the user 10 sees a front side.

In this case, the second object may correspond to information on an occurred event needed to be informed to the user 10. For instance, the second object can include an e-mail object, an SNS object, an SMS object, a telephone object, an alarm object, and the like. And, the second update information on the second object may correspond to information of relatively high importance compared to the information updated in a state of eyes-closed. In particular, the update for the second object may correspond to a case that the user 10 needs to recognize the update in the state of eyes-opened of the user 10. And, the second update information can occur when an event for the second object occurs only.

In another embodiment, in the state of eyes-closed of the user depicted in FIG. 2(b), the wearable display 100 can update first update information for a first object. In this case, the state of eyes-closed may include a state of temporarily closing eyes while the user blinks eyes as well as a state of closing eyes for a predetermined time.

In this case, the first object may correspond to an object continuously displayed in the display unit or an object frequently displayed in the display unit. For instance, the first object may include a time object, a weather object, a battery object, and the like. And, since the first update information on the first object is updated in the state of eyes-closed, the first update information may correspond to the information of a relatively low importance compared to the information updated in the state of eyes-opened. And, the first update information can be periodically generated according to a predetermined time interval.

In the following FIG. 3 to FIG. 9B, a method of updating update information, which is updated by the wearable display 100 mounted on a user, is described according to the state of eyes-opened/eyes-closed of the user and a type of an occurred event.

Figure 3:
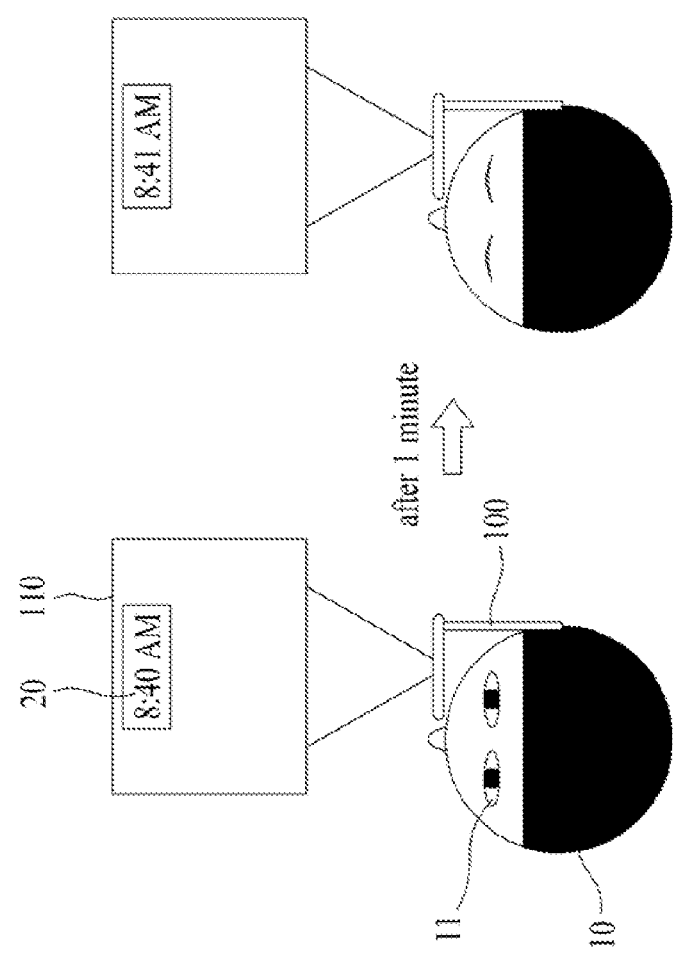
FIG. 3 is a diagram for a first embodiment a method of controlling a wearable display according to the present specification.

FIG. 3 is a diagram for a first embodiment of a method of controlling a wearable display according to the present specification. More specifically, FIG. 3 indicates a case that first update information is updated in the state of eyes-closed of a user 10.

As depicted in FIG. 3, the wearable display 100 can detect a generation of an event. In this case, the wearable display 100 may be in a state of being worn by the user 10. In this case, the event may correspond to information occurred to update an object displayed in the display unit 110 or an object to be displayed in the display unit. For instance, the generated event may include a time change, a weather change, a telephone reception, a message reception, an alarm reception, and the like. In the FIG. 3, the generated event corresponds to the time change, i.e., 'one minute elapse'.

And, the wearable display 100 can determine whether the generated event is the first update information. As mentioned earlier in FIG. 2, the first update information is information configured to update the first object and may correspond to the information of a relatively low importance compared to the information updated in the state of eyes-opened. For instance, the first update information may include weather update information, time update information, battery update information, and the like. In FIG. 3, the generated event is a change of time from '8:40 AM' to '8:41 AM'. Hence, the generated event may correspond to the first update information.

Meanwhile, if an event corresponds to the first update information, the wearable display 100 can recognize a condition to update a first object 20 corresponding to the first update information. In this case, the condition to update the first object 20 corresponds to eyes 11 status of a user 10. For instance, the condition to update the first object 20 can include a first condition that the user 10 closes the eyes 11 and a second condition that the user 10 opens the eyes 11. And, the first object may correspond to a target object to update the first update information. For instance, the first object may include a time object, a weather object, a battery object, and the like. Referring to FIG. 3, when the first update information occurs, the wearable display 100 can recognize it as the first condition that the user 10 closes the eyes 11.

And, if a recognized condition corresponds to the first condition, the wearable display 100 can update the first object 20 corresponding to the first update information. And, the wearable display 100 can display the updated first object 20 in the display unit 110. Referring to FIG. 3, since the eyes 11 of the user 10 correspond to the first condition when one minute elapses, the wearable display 100 can update the time object, which is the first object, from '8:40 AM' to '8:41 AM'. And, referring to FIG. 3, the wearable display 100 can display '8:41 AM', which is an updated state of the first object, in the display unit 110. By doing so, if the user 10 opens the users' eyes later, the user can recognize the first object updated to '8:41 AM'. In particular, according to the present specification, the user 10 does not need to see that the time is updated on every one minute in the state of eyes-opened.

As mentioned earlier in the embodiment of FIG. 3, in case of a frequently updated object such as time, the wearable display 100 updates the object in the state of eyes-closed, thereby reducing a sense of fatigue of the eyes of the user 10.

Figure 4:
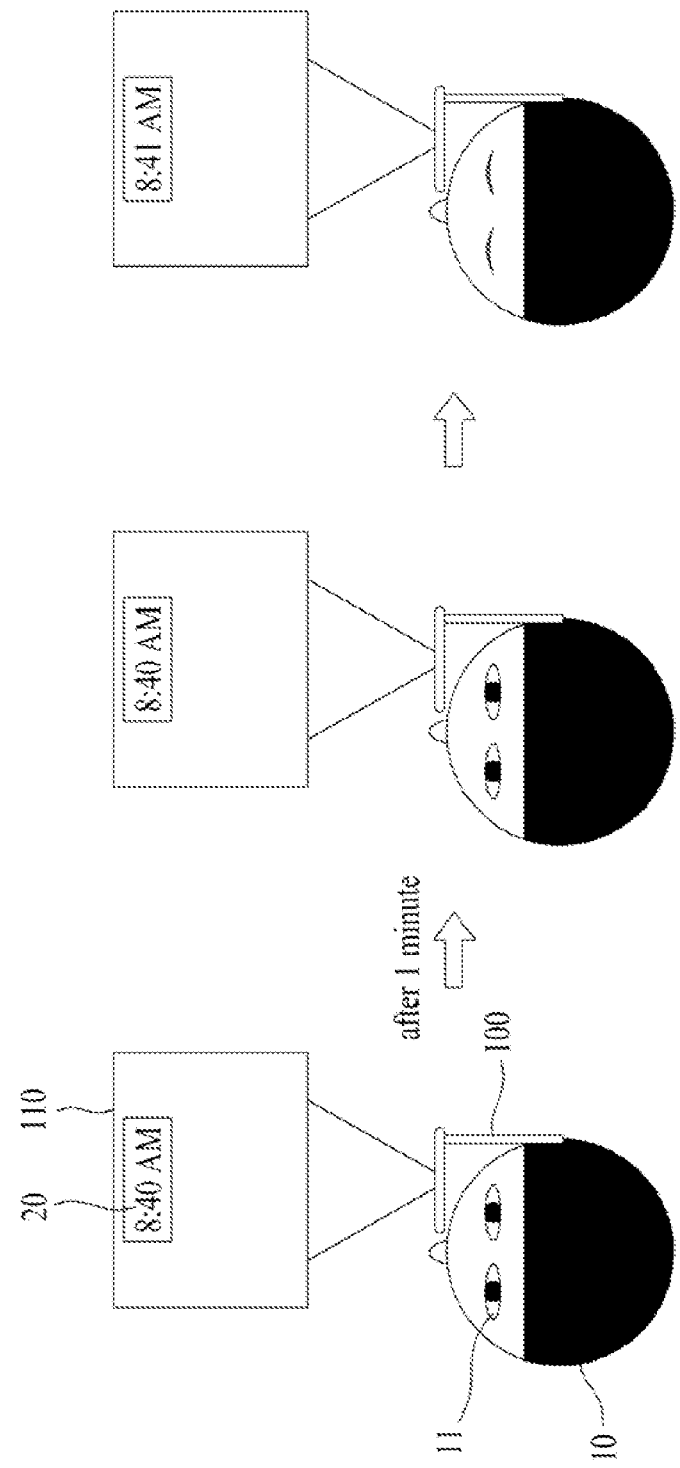
FIG. 4 is a diagram for a second embodiment of a method of controlling wearable display according to the present specification.

FIG. 4 is a diagram for a second embodiment of a method of controlling a wearable display according to the present specification. More specifically, FIG. 4 indicates a case that the first update information is updated in the state of eyes-opened of the user 10.

As depicted in FIG. 4, the wearable display 100 can detect a generation of an event. Referring to FIG. 4, the generated event may correspond to a time change. And, the wearable display 100 can determine whether the event is first update information. Referring to FIG. 4, the generated event is a change of time from '8:40 AM' to '8:41 AM'. Hence, the generated event may correspond to the first update information.

And, if an event corresponds to the first update information, the wearable display 100 can recognize a condition to update a first object 20 corresponding to the first update information. Referring to FIG. 4, when the first update information occurs, the wearable display 100 can recognize it as a second condition that the user 10 opens the eyes 11.

Hence, if a recognized condition corresponds to the second condition, the wearable display 100 can stop updating the first object 20 corresponding to the first update information until the recognized condition is switched from the second condition to the first condition. More specifically, if the user is in the state of eyes-opened when the first update information occurs, the wearable display 100 can stop updating the first object corresponding to the first update information until the user 10 is switched to the state of eyes-closed.

Referring to FIG. 4, when one minute elapsed, since the eyes 11 of the user 10 is in the state of eyes-opened, the wearable display 100 does not perform an update of the first object 20. This is because if the user 10 recognizes the time change on every minute in the state of eyes-opened, it may give a sense of fatigue and confusion to the eyes of the user. Hence, the wearable display 100 updates the time object of the display unit 100 to '8:41 AM' when the state of eyes-opened of the user 10 is shifted to the state of eyes-closed of the user 10 and can display '8:41 AM' in the display unit 110.

Referring to the embodiment of FIG. 4, in case of a frequently updated object such as time, although an update occurs, the wearable display 100 does not update in the state of eyes-opened. Instead, the wearable display updates in the state of eyes-opened, thereby reducing a sense of fatigue of the eyes of the user 10.

Meanwhile, unlike the aforementioned in FIG. 4, if recognized condition corresponds to a second condition and the recognized condition is not switched to the first condition until a predetermined time elapses, the wearable display 100 can update the first object corresponding to the first update information. In particular, if the user does not close the user's eyes until the time '8:40 AM' reaches to '8:42 AM' in a manner of elapsing '8:41 AM', the wearable display 100 can update the first object to '8:42 AM'. This is because if the state of eyes-opened of the user 10 is maintained for a long time, since the first update information, which is supposed to be updated, may be accumulated, the user 10 may be confused on the time later.

Figure 5:
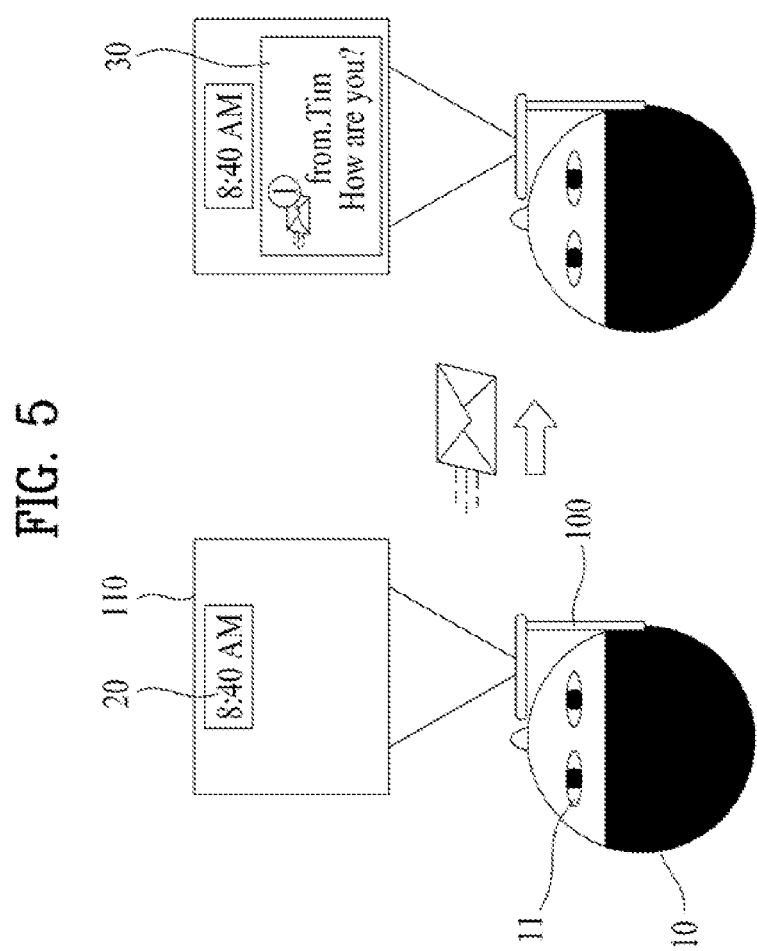
FIG. 5 is a diagram for a third embodiment of a method of controlling a wearable display according to the present specification.

FIG. 5 is a diagram for a third embodiment of a method of controlling a wearable display according to the present specification. More specifically, FIG. 5 indicates a case that second update information is updated in the state of eyes-opened of the user 10.

As depicted in FIG. 5, the wearable display 100 can detect a generation of an event. In FIG. 5, the generated event corresponds to a message reception, And, the wearable display 100 can determine whether the event corresponds to first update information. In FIG. 5, the generated event corresponds to the message reception and does not correspond to the first update information aforementioned in FIG. 2. In this case, the wearable display 100 can determine whether the event correspond to a second update information. As mentioned earlier in FIG. 2, the second update information is information to update a second object and may correspond to the information of a relatively high importance compared to the information updated in the state of eyes-closed. For instance, the second update information can include an e-mail reception, an SNS reception, an SMS reception, an alarm reception, and the like. In FIG. 5, the generated event corresponds to the SMS reception and may correspond to the second update information.

Meanwhile, if the event corresponds to the second update information, the wearable display 100 can recognize a condition to update a second object 30 corresponding to the second update information. In this case, the condition to update the second object 30 may indicate eyes 11 status of the user 10. For instance, the condition to update the second object may include a first condition that the user 10 closes the user's eyes 11 and a second condition that the user 10 opens the user's eyes 11. In FIG. 5, when the second update information occurs, the wearable display 100 can recognize it as the second condition that the user 10 opens the user's eyes 11. And, the second object 30 may correspond to a target object, to update the second update information. For instance, the second object can include an e-mail object, an SNS object, an SMS object, an alarm object, and the like.

Meanwhile, unlike the first object, the second object may not always be displayed in the display unit 110. In particular, the second object can be displayed in the display unit 110 when the second update information occurs or when the user 10 activates the second object only.

Hence, if a recognized condition corresponds to the second condition, the wearable display 100 can update the second object corresponding to the second update information. And, the wearable display 100 can display the updated second object in the display unit 110. In FIG. 5, since the eyes of the user correspond to the second condition when an SMS is received, the wearable display 100 can update an SMS object, which is the second object. And, in FIG. 5, the wearable display 100 can display a received SMS message 'How are you?' which is an updated state of the second object, in the display unit 110.

Referring to the embodiment of FIG. 5, the wearable display 100 can make the user 10 easily recognize an event occurrence in a manner of updating not an object regularly updated but an object updated on a specific event in the state of eyes-opened of the user 10.

Figure 6:
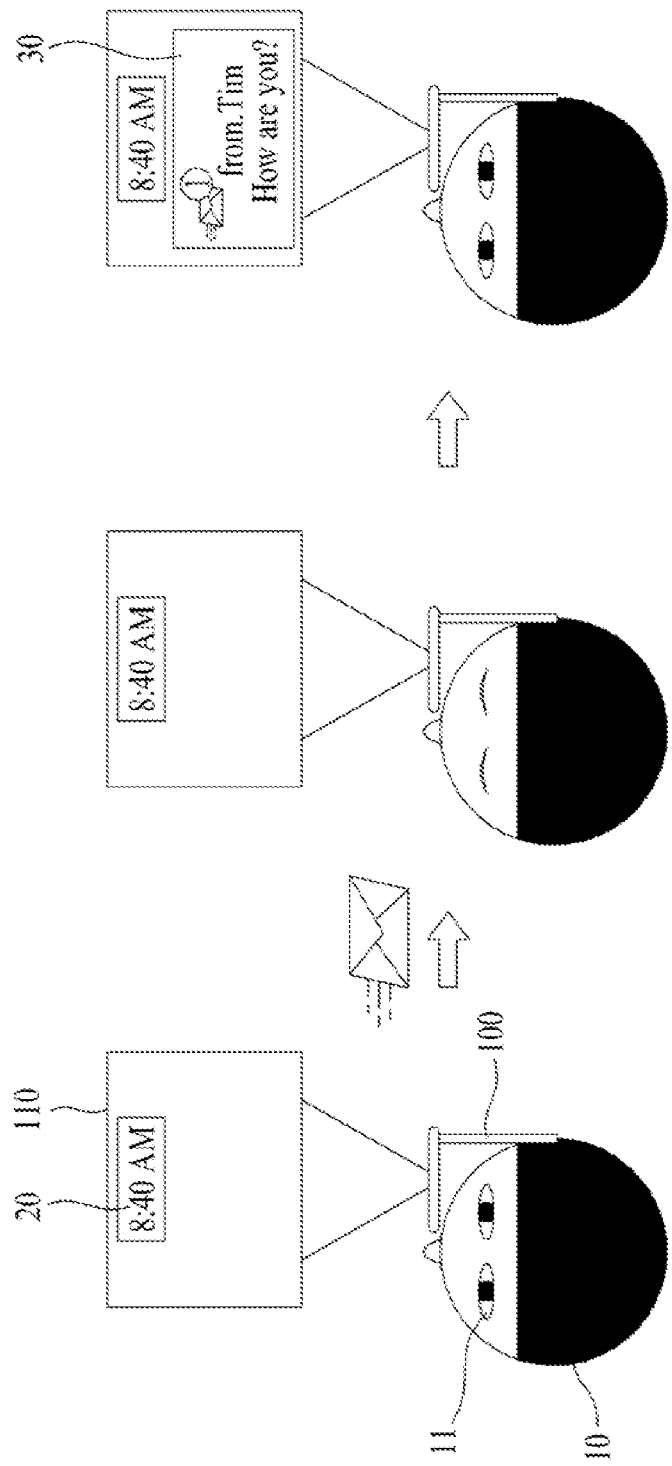
FIG. 6 is a diagram for a fourth embodiment of a method of controlling a wearable display according to the present specification.

FIG. 6 is a diagram for a fourth embodiment of a method of controlling a wearable display according to the present specification. More specifically, FIG. 6 indicates a case that second update information is updated in the state of eyes-closed of the user 10.

As depicted in FIG. 6, the wearable display 100 can detect a generation of an event. In FIG. 6, the generated event corresponds to an SMS reception. Subsequently, the wearable display 100 determines whether the generated event is first update information. If the generated event is not the first update information, the wearable display determines whether the generated event is second update information. In FIG. 6, the generated event corresponds to the 'SMS reception' and may correspond to the second update information.

And, if the event corresponds to the second update information, the wearable display 100 can recognize a condition to update a second object 30 corresponding to the second update information. In FIG. 6, when the second information occurs, the wearable display 100 can recognize it as a first condition that the user 10 closes the user's eyes 11.

In this case, if a recognized condition corresponds to the first condition, the wearable display 100 can stop updating of the second object 30 corresponding to the second update information until the recognized condition is switched to the second condition form the first condition. In FIG. 6, since the eyes 11 of the user 10 is in the state of eves-closed when the SMS is received, the wearable display 100 does not perform the update of the second object 30. And, when the eyes of the user is in the state of eyes-opened, the wearable display 100 updates the SMS object and can display 'How are you?' message in the display unit 110.

Referring to the embodiment of FIG. 6, in case of an event, which is supposed to be recognized by the user 10, the wearable display 100 updates the event in the state of eyes-opened of the user 10, thereby easily recognizing the occurred event by the user 10.

Meanwhile, unlike the aforementioned in FIG. 6, if the recognized condition corresponds to a first condition and the first condition is not switched to a second condition until a predetermined time elapses, the wearable display 100 can update a second object corresponding to second update information. And, the wearable display 100 can inform the user 10 of the update of the second object via a vibration, a sound and the like in the state of the first condition. In particular, if the user 10 do not open the user's eyes until a predetermined time elapses after 'How are you?' message is received, the wearable display 100 can inform the user of the 'How are you?' message received in the second object by such a means as a vibration and a sound. This is because if the state of eyes-closed of the user 10 is maintained for a long time, since plurality of the second update information occur, it is intended to inform the user that the second update information has arrived by such a means as a vibration and a sound.

FIG. 7 is a diagram for a fifth embodiment of a method of controlling a wearable display according to the present specification. More specifically, FIG. 7 indicates that plurality of second update information is updated in the state of eyes-opened of the user 10. And, the second embodiment indicates a case that plurality of the second update information is generated in a second condition.

In one embodiment, the wearable display 100 can update plurality of second update information and display second update information on a first event among plurality of generated events in the display unit 110. In this case, plurality of the generated second update information may correspond to a case that a sending address of an event is identical to each other. This is because if a plurality of messages are sent from an identical person, if a message reception is informed to the user, it is not necessary to show all of a plurality of the messages to the user 10.

As depicted in FIG. 7, plurality of the second update information corresponds to update information on 'SMS object', which is a second object and can include 4 update information. And, in FIG. 7, plurality of the second update information has an identical sending address, which is 'Tim'. Hence, the wearable display 100 updates all of plurality of the second information and displays 'How are you', which is the second update information on the first event, in the display unit 110. The remaining second update information can be represented by a number only.

In another embodiment, the wearable display 100 can update plurality of the second update information and sequentially display plurality of the generated second update information in the display unit 110. In this case, plurality of the generated second update information may have a sending address of an event different from each other. This is because in case of a plurality of messages sent from a person different from each other, it is necessary to inform the user 10 that each message is received from a person different from each other.

Although it is not depicted in FIG. 7, if plurality of the second update information is detected, the wearable display 100 can display plurality of the second update information in the display unit 110 in an order of being detected.

FIGS. 8A and 8B are diagrams for a sixth embodiment of a method of controlling a wearable display according to the present specification. More specifically, FIG. 8A indicates that first update information is updated in the state of eyes-closed of the user 10 and FIG. 8B indicates that the first update information is updated in the state of eyes-opened of the user 10. Yet, FIG. 8A and FIG. 8B indicates a case that the first update information is generated and then the first object is updated after a first time (T1) elapsed.

First of all, referring to FIG. 8A, the wearable display 100 can recognize that the user 10 sees a first object 20 displayed in the display unit 110 in the state of eyes-opened on a timing point A. And, a time object displayed in the display unit 110 on the timing point A corresponds to '8:40 AM'.

Meanwhile, the wearable display 100 can detect an event on a timing point B. In this case, the event corresponds to a change of time from '8:40 AM' to '8:41 AM' and may correspond to the first update information.

And, the wearable display 100 can recognize the state of eves-closed of the user 10 as a condition to update the first object 20 corresponding to the first update information on the timing point B. And, if the wearable display 100 recognizes the state of eyes-closed of the user 10 on a timing point C of which a first time (T1) elapses from the timing point B, the first update information can be updated in the first object 20. In this case, the first time (T1) corresponds to a predetermined time and indicates a time taken from an occurrence of the first update information to a practical update of the first update information.

In this case, when the first condition to update the first object 20 corresponding to the first update information after an event has occurred, the wearable display 100 may not directly update the first object 20. In particular, the wearable display 100 can update the first object 20 after the first time (T1) elapses from the occurrence of the event in the first condition. This is because if the first condition is changed to the second condition, which is the state of eyes-opened, before the first time (t1) elapses from the occurrence of the update information, it is not necessary to update the first object.

Subsequently, referring to FIG. 8B, since the timing point A and the timing point B are identical to those of FIG. 8A, explanation on the timing point A and the timing point B is omitted.

The wearable display 100 can recognize a second condition, which corresponds to the state of eyes-opened of the user 10, on the timing point C of which the first time (T1) elapses from the timing point B. In this case, unlike the aforementioned in FIG. 8A, the wearable display 100 does not update the first update information in the first object 20 on the timing point of C.

In particular, the wearable display 100 can update the first update information in the first object on a timing point D, which is a timing point that the eyes of the user correspond to the first condition again. This is because if the first object 20 is updated in the second condition, it may give a sense of fatigue to the eyes 11 of the user 10. Hence, the first object 20 is updated when the eyes of the user correspond to the first condition again.

FIGS. 9A and 9B are diagrams for a seventh embodiment of a method of controlling a wearable display according to the present specification. More specifically, FIG. 9A indicates that the second update information is updated in the state of eyes-opened of the user 10 and FIG. 9B indicates that the second update information is updated in the state of eyes-closed of the user 10. Yet, FIG. 9A and FIG. 9B indicate a case that the second update information is generated and then the second object is updated after a second time (T2) elapsed.

First of all, referring to FIG. 9A, the wearable display 100 can recognize that the user 10 sees the first object 20 displayed in the display unit 110 in the state of eyes-opened of the user 10 on the timing point A. In this case, the first object 20 can always be displayed in the display unit 110 irrespective of an occurrence of an event. On the contrary, the second object 30 can be displayed in the display unit 110 when an event occurs only.

Meanwhile, the wearable display 100 can detect an event on the timing point of B. In this case, the event may correspond to an SMS reception. If the event is not the first update information, the wearable display 100 can determine whether the event corresponds to the second update information. In FIG. 9A, the message reception event corresponds to the second update information. And, the wearable display 100 can recognize the state of eyes-opened of the user 10 as a condition to update the second update information on the timing point of B. If the state of eyes-opened of the user 10 is recognized on the timing point of C of which the second time (T2) elapses from the timing point B, the wearable display 100 can update the second update information in the second object 30. In this ease, the second time (T2) corresponds to a predetermined time and indicates a time taken from an occurrence of the second update information to a practical update of the second update information. And, since it is necessary for the second time (T2) to immediately inform the user of an event occurrence, the second time may correspond to a short time less than 0.1 second.

In this case, when the second condition to update the second object 30 corresponding to the second update information after an event, has occurred, the wearable display 100 may not directly update the second object 30 on the timing point of B. In particular, the wearable display 100 can update the second object 30 after the second time (T2) elapses from the occurrence of the event in the second condition. This is because if the second condition is changed to the first condition, which is the state of eyes-closed, before the second time (T2) elapses from the occurrence of the update information in the second condition, it is not necessary to update the second object.

Subsequently, referring to FIG. 9B, since the timing point A and the timing point B are identical to those of FIG. 9A, explanation on the timing point A and the timing point B is omitted. The wearable display 100 can recognize a first condition, which corresponds to the state of eyes-closed of the user 10, on the timing point C of which the second time (T2) elapses from the timing point B. In this case, unlike the aforementioned in FIG. 9A, the wearable display 100 does not update the second update information in the second object 20 on the timing point of C.

In particular, the wearable display 100 can update the second update information in the second object 30 on a timing point D, which is a timing point that the eyes 11 of the user 10 correspond to the second condition again. This is because if the second object 30 is updated in the first condition, it may not recognize an event although the event, which is supposed to be recognized by the user 10, has occurred.

Figure 10A:
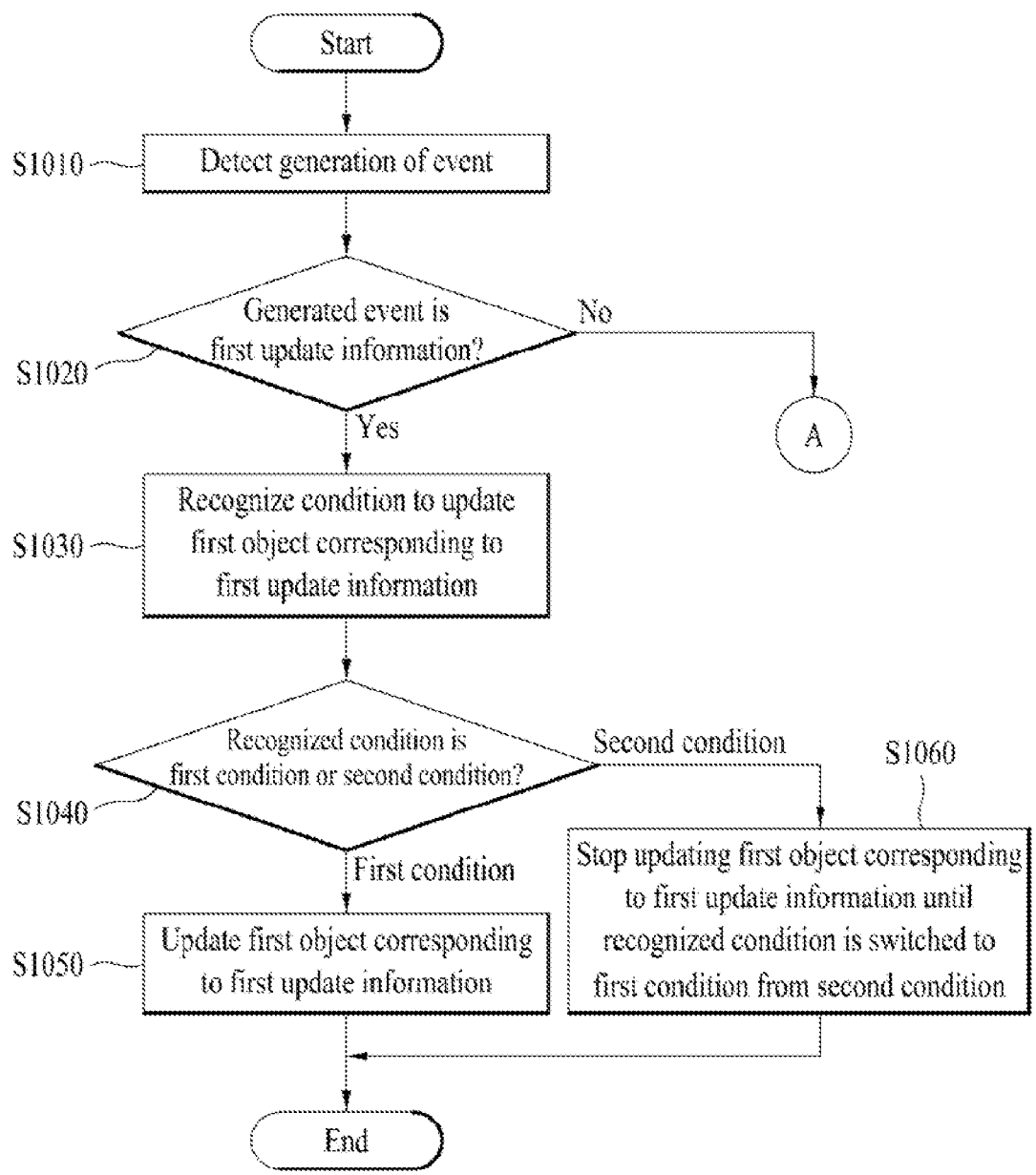
FIG. 10A and FIG. 10B indicate a flowchart of a method of controlling a wearable display according to the present specification.
Figure 10B:
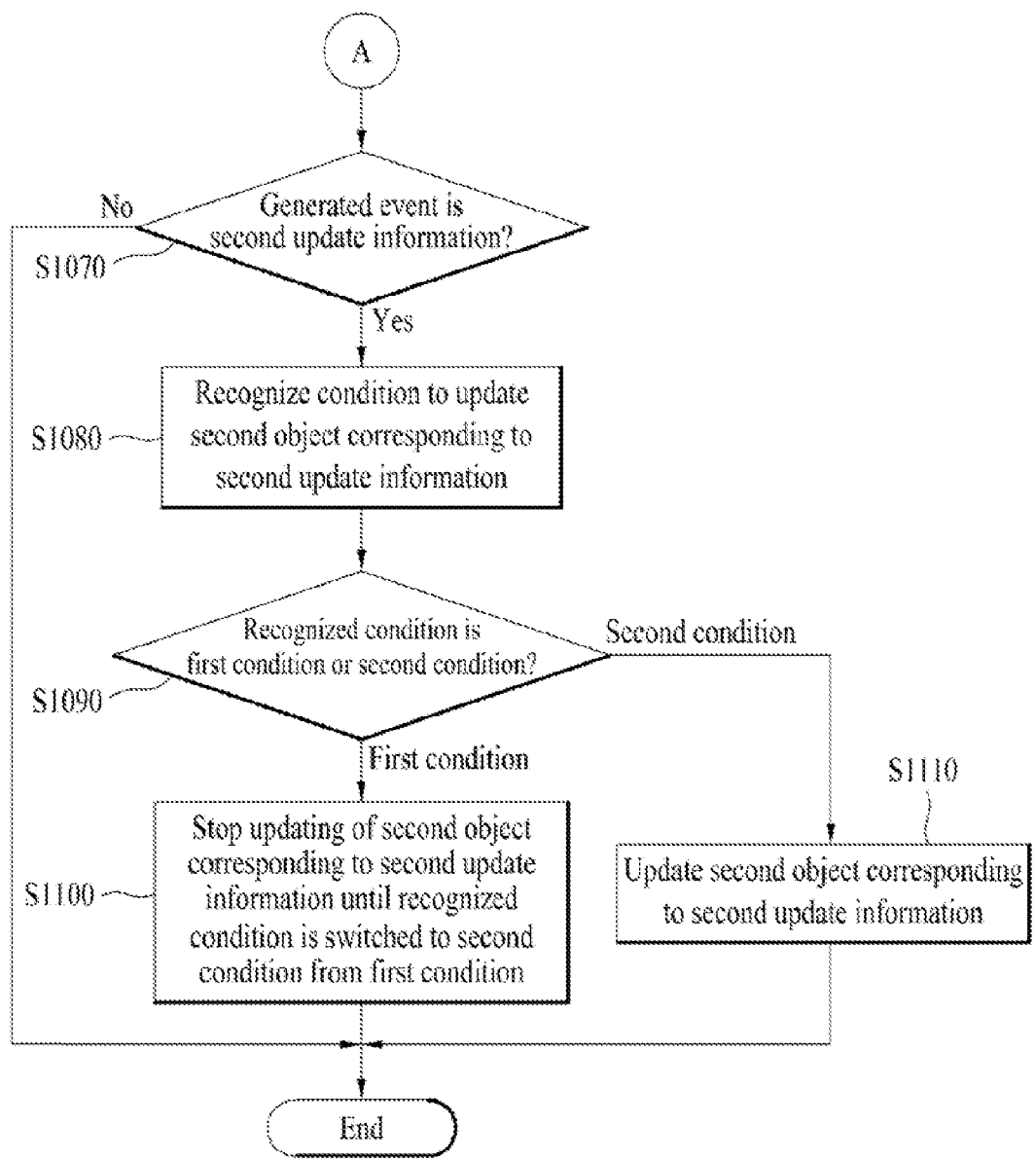

FIGS. 10A and 10B indicate a flowchart of a method of controlling a wearable display according to the present specification. Each step of FIG. 10A and FIG. 10B explained in the following description can be controlled by the processor 140 of the wearable display 140 depicted in FIG. 1.

First of all, the wearable display 140 can detect a generation of an event [S1010]. As mentioned earlier in FIG. 3, the event may correspond to information occurred to update an object displayed or to be displayed in the display unit 110. For instance, the generated event may include a time change, a weather change, a telephone reception, a message reception, and the like.

Subsequently, the wearable display can determine whether the generated event corresponds to first update information [S1020]. As mentioned earlier in FIG. 3, the first update information may correspond to information to update a first object. For instance, the first update information may include a weather update, a time update, a battery update, and the like.

In the step S1020, if the generated event corresponds to the first update information, the wearable display can recognize a condition to update the first object corresponding to the first update information [S1030]. In this case, the condition to update the first object corresponds to an eyes status of the user. For instance, the condition to update the first object may include a first condition that the user closes the user's eyes and a second condition that the user opens the user's eyes.

Subsequently, the wearable display can determine whether a recognized condition corresponds to the first condition or the second condition [S1040]. The wearable display can recognize/determine a state of eyes-opened and a state of eyes-closed of the user by a camera installed in the wearable display.

In the step S1040, if the recognized condition corresponds to the first condition, the wearable display can update the first object corresponding to the first update information [S1050]. In particular, as mentioned earlier in FIG. 3, the wearable display can update the first object such as the time object in the state of eyes-closed of the user. And, the wearable display displays the updated first object in the display unit and makes the user recognize the updated first object in the state of eyes-opened of the user.

In the step S1040, if the recognized condition corresponds to the second condition, the wearable display can stop updating the first object corresponding to the first update information until the recognized condition is switched to the first condition from the second condition [S1060]. In particular, as mentioned earlier in FIG. 4, the wearable display stops updating of the first object in the state of eyes-opened of the user and can update the first object in a next first condition.

Meanwhile, in the step S1020, if the generated event does not correspond to the first update information, the wearable display can determine whether the generated event corresponds to second update information [S1070]. As mentioned earlier in FIG. 5, the second update information may correspond to information to update a second object. For instance, the second update information can include an e-mail reception, an SMS reception, an SNS update, and the like.

In the step S1070, if the generated event corresponds to the second update information, the wearable display can recognize a condition to update the second object corresponding to the second update information [S1080]. Subsequently, the wearable display can determine whether the recognized condition corresponds to a first condition or a second condition [S1090].

In the step S1090, if the recognized condition corresponds to the first condition, the wearable display can stop updating the second object corresponding to the second update information until the recognized condition is switched to the second condition from the first condition [S1100]. In particular, as mentioned earlier in FIG. 6, the wearable display can stop updating the second object in the state of eyes-closed of the user and can update the second object in a next second condition.

In the step of S1090, if the recognized condition corresponds to the second condition, the wearable display can update the second object corresponding to the second update information [S1110]. In particular, as mentioned earlier in FIG. 5, the wearable display can update the second object such as the SMS object in the state of eyes-opened of the user. And, the wearable display displays the updated second object in the display unit and makes the user recognize that the second object is updated.

Figure 11:
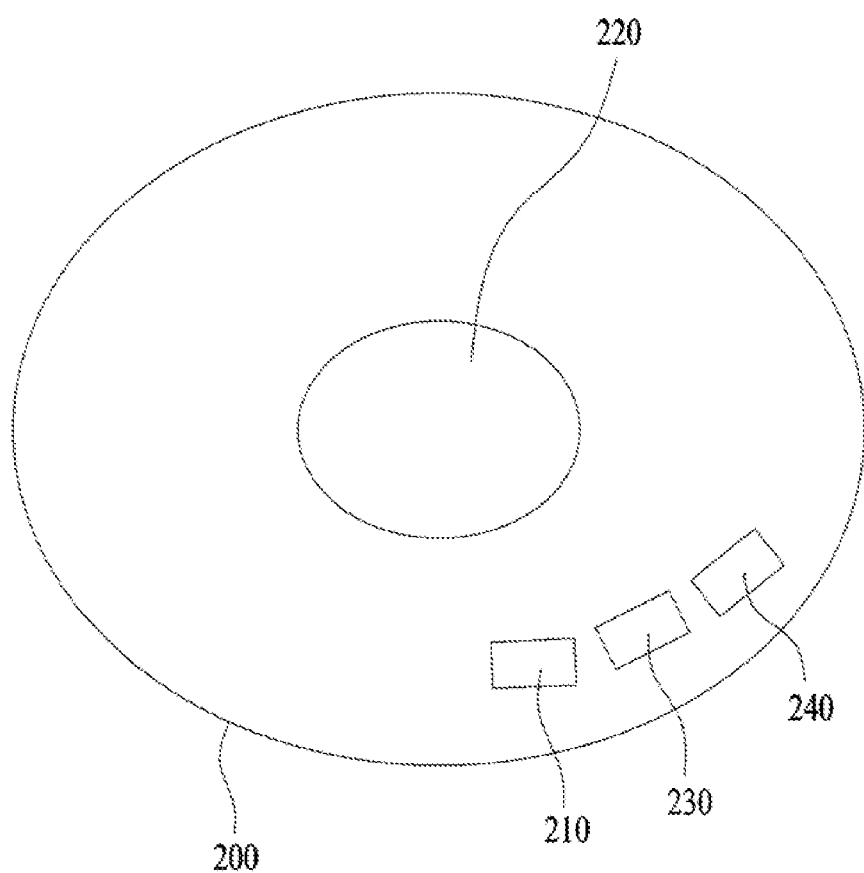
FIG. 11 is a diagram for a smart contact lens according to one embodiment of the present specification.

FIG. 11 is a diagram for a smart contact lens 200 according to one embodiment of the present specification. The aforementioned wearable display can be implemented in a form of the smart contact lens 200. The smart contact lens 200 can include a power unit 210, a display unit 220, a sensor unit 230 and a processor 240. As an optional configuration, the smart contact lens 200 may further include a communication unit. According to embodiment, the smart contact lens 200 can include the power unit 210, the display unit 220 and the sensor unit 230 between two contact lenses.

The power unit 210 of the smart contact lens 200 can supply power to the smart contact lens 200. The power unit 210 may include a micro power generator. If the smart contact lens 200 is worn on eyes of a user, the power unit 210 can generate electric power using the micro power generator. The micro power generator included in the power unit 210 can generate electric power via a piezoelectric element using pressure occurred when the user blinks eyes of the user. And, according to embodiment, the power unit 210 may include a solar-light panel and the power unit 210 can generate electric power using solar-light. The power unit 210 can supply generated electric power to the display unit 220, the sensor unit 230 and the processor 240.

The power unit 210 can further include a battery. The power unit can store generated electric power in the battery and can supply the stored power to the display unit 220, the sensor unit 230 and the processor 240.

The display unit 220 can provide visual information to a user. The display unit 220 can display the visual information on the smart contact lens 200. And, as a different embodiment, the display unit 220 can project the visual information onto eyes of the user. The projected visual information stimulates an optic nerve of the user via pupils of the eyes and makes the user check the visual information in vision. In order to project the visual information onto the eyes of the user, the display unit 220 may use solar-light. The display unit 220 can display visual information displayed according to a control command of the processor 240 in a manner of updating the visual information.

The sensor unit 230 can sense a blink of a user. In particular, the sensor unit 230 can sense whether the eyes of the user is in an opened state or a closed state. The sensor unit 230 can include at least one selected from the group consisting of a proximity sensor, an illumination sensor and a pressure sensor. The sensor unit 230 detects whether eyelids of a user is positioned near the sensor using the proximity sensor and may be then able to sense the blink of the user. And, the sensor unit 230 senses illumination difference in case of opening/closing eyes of the user using the illumination sensor and may be then able to sense the blink of the user. And, the sensor unit 230 senses pressure difference in case of opening/closing eyes of the user using the pressure sensor and may be then able to sense the blink of the user. The sensor unit 230 can transmit information on the sensed blink of the user to the processor 240.

The processor 240 can control the power unit 210, the display unit 220 and the sensor unit 230. The processor 240 receives the information on the blink of the user sensed by the sensor unit 230 and may be then able to determine whether to update displayed visual information based on the received information on the blink of the eyes. Although an event configured to update the visual information occurs, if the eyes of the user are in an opened state, the processor 240 may postpone the update of the visual information until the eyes of the user switch to a closed state.

For instance, if the event configured to update the visual information occurs on first time and the eyes of the user is in the opened state, the processor 240 can postpone the update of the visual information without updating. If the processor 240 receives information indicating that the eyes of the user have switched to the closed state on second time, which corresponds to time on which prescribed time is passed by from the first time, from the sensor unit 230, the processor 240 can update the visual information on the second time at last. By doing so, the processor 240 of the smart contact lens 200 can update the visual information without scattering attention of the user.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A wearable display and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a wearable display according to the present specification and a method of controlling therefor can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, to implement in a form of a carrier wave such as a transmission via the internet and the like is also included. And since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

What is claimed is:

1. A wearable display device, comprising:
a display unit configured to display visual information;
a sensor unit configured to recognize eyes of a user of the wearable display device; and
a processor configured to update the displayed visual information when an event is detected,
wherein the processor is further configured to:
detect the event at a first time,
postpone updating the displayed visual information when the recognized eyes are in a state of eyes-opened, and
update the displayed visual information when the state of eyes-opened is switched to a state of eyes-closed at a second time.

2. The wearable display device of claim 1, wherein the displayed visual information is not updated until the state of eyes-closed is recognized.

3. The wearable display device of claim 1, wherein, when a predetermined time elapses from the first time and the state of eyes-opened is not switched, the displayed visual information is updated before the second time.

4. The wearable display device of claim 3, wherein the displayed visual information is first type information including at least one of time information, weather information, and battery information.

5. The wearable display device of claim 4, wherein the displayed visual information is second type information including at least one of alarm information, mail information, and message information.

6. The wearable display device of claim 5, wherein the predetermined time of the first type information is longer than the predetermined time of the second type information.

7. The wearable display device of claim 5, wherein the second type information is updated immediately when the event is detected at the first time.

8. The wearable display device of claim 4, the first type information is information which is periodically updated.

9. The wearable display device of claim 1, wherein the updated visual information is displayed before the state of eyes-closed is switched back to the state of eyes-opened.

10. The wearable display device of claim 1, wherein the switching from the state of eyes-opened to the state of eyes-closed includes a blink of the user.

11. A method of controlling a wearable display device, comprising:
displaying visual information in a display unit of the wearable display device;
detecting an event for updating the displayed visual information at a first time;
recognizing eyes of a user of the wearable display device;
postponing updating the displayed visual information when the recognized eyes are in a state of eyes-opened; and
updating the displayed visual information when the state of eyes-opened is switched to a state of eyes-closed at a second time.

12. The method of claim 11, wherein the displayed visual information is not updated until the state of eyes-closed is recognized.

13. The method of claim 11, wherein, when a predetermined time elapses from the first time and the state of eyes-opened is not switched, the displayed visual information is updated before the second time.

14. The method of claim 13, wherein the displayed visual information is first type information including at least one of time information, weather information, and battery information.

15. The method of claim 14, wherein the displayed visual information is second type information including at least one of alarm information, mail information, and message information.

16. The method of claim 15, wherein the predetermined time of the first type information is longer than the predetermined time of the second type information.

17. The method of claim 15, wherein the second type information is updated immediately when the event is detected at the first time.

18. The method of claim 14, the first type information is information which is periodically updated.

19. The method of claim 11, wherein the updated visual information is displayed before the state of eyes-closed is switched back to the state of eyes-opened.

20. The method of claim 11, wherein the switching from the state of eyes-opened to the state of eyes-closed includes a blink of the user.

* * * * *